US012443773B2

(12) United States Patent
Nonclercq et al.

(10) Patent No.: US 12,443,773 B2
(45) Date of Patent: Oct. 14, 2025

(54) METHOD OF ASSEMBLING PARTS OF A PRODUCT

(71) Applicant: Dassault Systemes, Vélizy-Villacoublay (FR)

(72) Inventors: Arnaud Nonclercq, Vélizy-Villacoublay (FR); Sébastien Brossolasco, Vélizy-Villacoublay (FR)

(73) Assignee: Dassault Systemes, Velizy-Villacoublay (FR)

( * ) Notice: Subject to any disclaimer, the term of this patent is extended or adjusted under 35 U.S.C. 154(b) by 1113 days.

(21) Appl. No.: 16/235,177

(22) Filed: Dec. 28, 2018

(65) Prior Publication Data
US 2019/0244114 A1 Aug. 8, 2019

(30) Foreign Application Priority Data

Dec. 29, 2017 (EP) .................................... 17306982

(51) Int. Cl.
*G06F 30/00* (2020.01)
*G06F 16/2457* (2019.01)
(Continued)

(52) U.S. Cl.
CPC .......... *G06F 30/18* (2020.01); *G06F 16/2457* (2019.01); *G06F 16/288* (2019.01);
(Continued)

(58) Field of Classification Search
CPC ........... G06N 5/00; G06F 16/00; G06F 30/00; G06F 16/9024; G06F 16/288; G06F 16/2457; G06F 30/10; G06F 2111/20
See application file for complete search history.

(56) References Cited

U.S. PATENT DOCUMENTS

| 8,645,107 B2 | 2/2014 | Gibson et al. |
| 9,043,360 B2 * | 5/2015 | Fang ........................ G06N 5/02 707/776 |

(Continued)

FOREIGN PATENT DOCUMENTS

| JP | 09-190456 A | 7/1997 |
| WO | 2017/074559 A1 | 4/2017 |

OTHER PUBLICATIONS

Extended Search Report issued on Oct. 24, 2018, in European Patent Application No. 17306982.4-1224. (30 pgs.).

(Continued)

*Primary Examiner* — Marc S Somers
(74) *Attorney, Agent, or Firm* — Oblon, McClelland, Maier &Neustadt, L.L.P.

(57) ABSTRACT

The disclosure notably relates to a computer-implemented method of assembling parts of a product. The method comprises building a non-hierarchical graph from at least one products, the graph comprising nodes and edges between nodes, a node representing a part of the product to be assembled and an edge representing a relationship between a pair of parts represented by nodes, providing a part of the product to be completed, performing, upon user action, a selection on the provided part, identifying in the graph a node representing the selected part and one or more nodes that have the closest relationships to the node representing the selected part.

12 Claims, 9 Drawing Sheets

(51) Int. Cl.
*G06F 16/28* (2019.01)
*G06F 16/901* (2019.01)
*G06F 30/12* (2020.01)
*G06F 30/17* (2020.01)
*G06F 30/18* (2020.01)
*G06F 30/20* (2020.01)
*G06F 111/20* (2020.01)
*G06T 15/06* (2011.01)
*G06T 15/10* (2011.01)

(52) U.S. Cl.
CPC .......... *G06F 16/9024* (2019.01); *G06F 30/00* (2020.01); *G06F 30/12* (2020.01); *G06F 30/17* (2020.01); *G06F 30/20* (2020.01); *G06T 15/06* (2013.01); *G06T 15/10* (2013.01); *G06F 2111/20* (2020.01)

(56) References Cited

U.S. PATENT DOCUMENTS

| | | | |
|---|---|---|---|
| 2002/0107673 A1* | 8/2002 | Haller | G06F 30/00 703/1 |
| 2003/0107602 A1* | 6/2003 | Kawai | G06F 30/00 715/771 |
| 2008/0098311 A1 | 4/2008 | Delarue et al. | |
| 2008/0307301 A1* | 12/2008 | Decker | G06F 16/9577 715/241 |
| 2011/0273447 A1* | 11/2011 | Abe | G06F 30/17 345/420 |
| 2012/0047149 A1* | 2/2012 | Zhou | G06F 40/205 707/E17.011 |
| 2015/0042654 A1* | 2/2015 | Segasby | G06T 19/20 345/426 |
| 2015/0186555 A1 | 7/2015 | Divekar | |
| 2015/0347572 A1* | 12/2015 | Yang | G06F 16/35 707/754 |
| 2017/0066092 A1 | 3/2017 | Yamamoto | |
| 2017/0371948 A1 | 12/2017 | Rorato | |
| 2019/0042667 A1* | 2/2019 | Amadon | G06N 20/00 |
| 2019/0274554 A1* | 9/2019 | Yoon | G06Q 50/22 |

OTHER PUBLICATIONS

European Search Report Issued Jun. 28, 2018 in European Application No. EP17306982.4.

Jaiswal Prakhar et al: Assembly-based conceptual 3D modeling with unlabeled components using probabilistic factor graph, Computer Aided Design, Elsevier Publishers, vol. 74, Nov. 10, 2015, pp. 45-54.

K Merriliance: "Chapter 4 Object Picking Using Mouse Picking Technique" An Analytical Study of Various Object Picking Algorithms in Non Immersive Virtual World, Feb. 10, 2017, pp. 134-150.

Abhijit S. Deshmukh: "Content-based search of mechanical assemblies", Jan. 1, 2006 (149 pages).

Hij Kai-Mo et al: Relaxed lightweight assembly retrieval using vector space model, Computer Aided Design, Elsevier Publishers, vol. 45, No. 3, Oct. 7, 2012, pp. 739-750.

Chu C-H et al: "Similarity assessment of 3D mechanical components for design reuse". Robotics and Computer Integrated Manufacturing, Elsevier Science Publishers, vol. 22, No. 4, Aug. 1, 2005, pp. 332-341.

Pradeep Khosla et al: "Determining the Assembly Sequence From a 3-D Model", Journal of Mechanical Working Technology, vol. 20, Sep. 13, 1989 (Abstract only).

Japanese Notice of Reasons for Refusal issued Nov. 22, 2022, in Japanese Patent Application No. 2018-241152, 3 pages (with English Translation).

Combined Chinese Office Action and Search Report issued on Oct. 20, 2023 in Chinese Patent Application No. 201811609394.5 (with unedited computer-generated English translation), 22 pages.

Office Action dated Jun. 13, 2024, issued in counterpart CN Application No. 201811609394.5, with English Translation, (11 pages).

* cited by examiner

METHOD OF ASSEMBLING PARTS OF A PRODUCT

CROSS-REFERENCE TO RELATED APPLICATIONS

This application claims priority under 35 U.S.C. § 119 or 365 to European Application No. EP 17306982.4, filed Dec. 29, 2017. The entire contents of the above application(s) are incorporated herein by reference.

FIELD OF THE INVENTION

The invention relates to the field of computer programs and systems, and more specifically to a method, system and program for assembling parts of a product.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Figure 2:
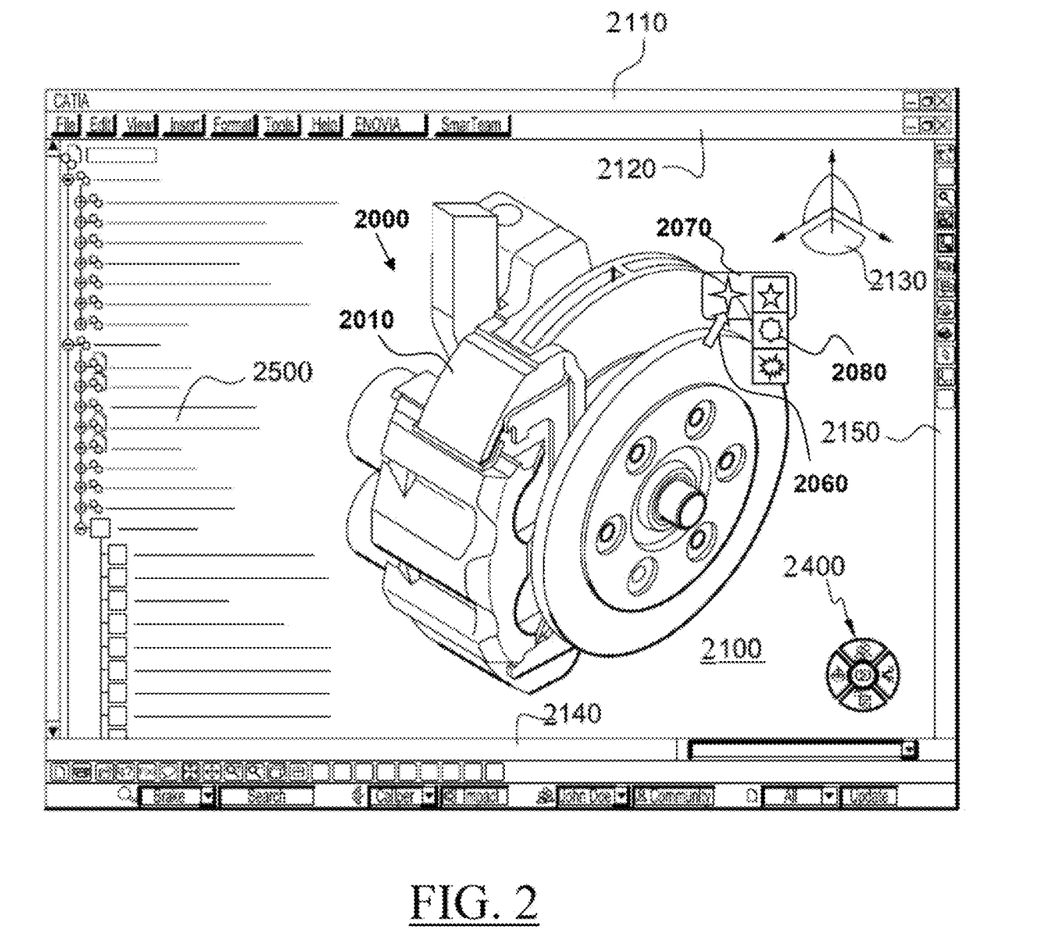
FIG. 2 shows an example of a graphical user interface of the system.
Figure 3:
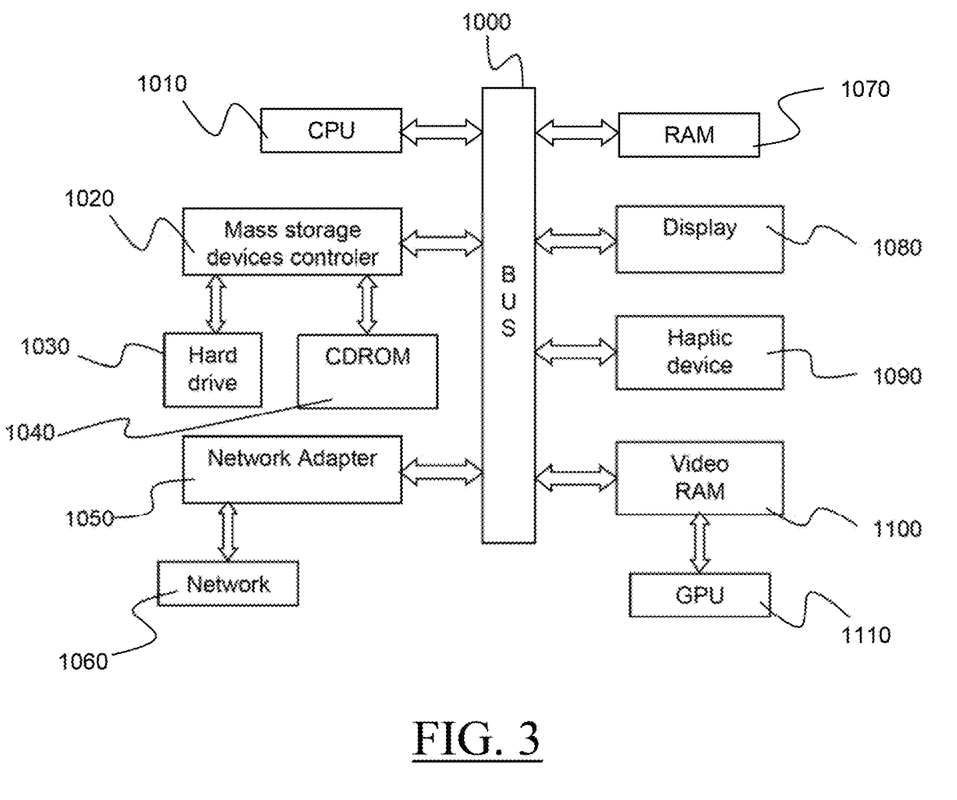
FIG. 3 shows an example of the system.
Figure 4:
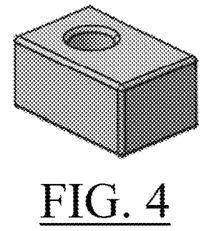
FIGS. 4, 5, 6 and 7 illustrate examples of selection on a modeled object.
Figure 5:
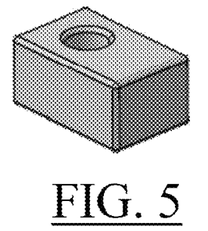
Figure 6:
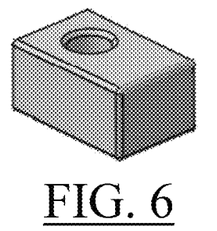
Figure 7:
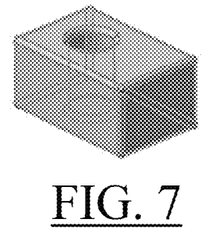

Selection is at the heart of the user experience when interacting with a CAD system, especially when interacting with an object modeled with a CAD system. indeed, in 3D, there are several types of selections, as illustrated on FIGS. 4 to 7. FIG. 4 illustrates no selection, while FIG. 2 shows the selection of an edge, FIG. 3 the selection of a face, and FIG. 4 the full selection of the object. The selected geometry(ies) is(are) represented to the user with a different color in the examples of FIGS. 5 to 7.

Several remarks about the selection mechanism are now discussed. In 3D, there are several levels of possible selections and it is possible to multi select part sub-elements thru the paradigm of maintaining a pressed a key (e.g. shift-key or ctrl-key) while clicking with the mouse on the object. This mechanism exists since 1980's, no main change for many years. However, this is a pure client-side approach: a selection on the geometry has usually no impact on the server side. If so, the system usually takes into account the part identifier and not the part geometry, and still less, the point coordinates within the geometry . . . Especially, when assembling two parts, the selection mechanism is complex because it requires the following two tedious steps that are (i) the selection of faces to put in coincidence, and (ii) the definition of a state of the position for the remaining degree of liberty.

Hence, the current selection does not anticipate at all the user intents when he is selecting or moving a part in the context of an assembly. CAD is unable to suggest solutions in taking into account all information available in the user context. The user context may comprise one or more of the model assembly, user rules, commands used by the user, the workbench that is used, the viewpoint on the model . . . ). In the context of an assembly, the selection is not smart at all and does not take into account all existing and possible solutions already found in the past in a similar context. Therefore, there is no way to anticipate the next parts to be added and positioned when assembling parts of a product.

Within this context, there is still a need for an improved way to assemble parts of a product.

SUMMARY OF THE INVENTION

It is therefore provided a computer-implemented method of assembling parts of a product. The method comprises building a non-hierarchical graph from at least one products, the graph comprising nodes and edges between nodes, a node representing a part of the product to be assembled and an edge representing a relationship between a pair of parts represented by nodes, providing a part of the product to be completed, performing, upon user action, a selection on the provided part, identifying in the graph a node representing the selected part and one or more nodes that have the closest relationships to the node representing the selected part.

The method may comprise one or more of the following:
  performing the selection on the provided part further comprises identifying a location on the provided part of the product, and wherein identifying in the graph the node representing the selected part comprises identifying in the graph the node with the identified location on the provided part;
  identifying the location on the provided part comprises computing an intersection between a geometry of the part and ray traced upon user action;
  identifying the one or more nodes that have the closest relationships to the node representing the selected part comprises obtaining signatures of the nodes of the graph that are connected with an edge to the node representing the selected part, identifying one or more most similar signatures with the signature of the node representing the selected part;
  identifying the one or more nodes that have the closest relationships to the node representing the selected part further comprises identifying an orientation associated with the part of the product to be completed and associating identified orientations with each of the one or more nodes that have the closest relationships to the node representing the selected part, identifying, among the one or more similar signatures, at least one signature whose orientation matches with the orientation of the provided part of the product;
  the identified location on the provided part comprises a functional zone of the provided part, a functional zone of the provided part comprising a fit relationship with another part;
  the fit relationship of a functional zone defines a standardized connection between two parts;

the identified one or more nodes have the best fit with the node representing the selected part;

identifying the one or more nodes having the best fit comprises identifying the one or more nodes having the closest clashes with the less interferences;

a relationship represented by an edge is one selected among (i) a father/child relationship that represents a hierarchy between a pair of parts, (ii) a neighbor relationship that represents a distance between a pair of parts, (iii) a similar shape relationship that represents a global or local similarity in form of a pair of parts, (iv) a similar function relationship that represents local equivalence of connections between two parts;

building the non-hierarchical graph from at least one products comprises, for each part of each product, computing one or more signatures that have a metric, for each pair of parts of the products having a common metric:—defining an edge between the nodes representing the pair of parts,—associating a type of relationship and a weight that is a value representing the distance between the values of the common metric;

an edge is defined between the parts of a pair when the distance is greater that a minimal distance.

It is further provided a computer program comprising instructions for performing the method.

It is further provided a computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Figure 1:
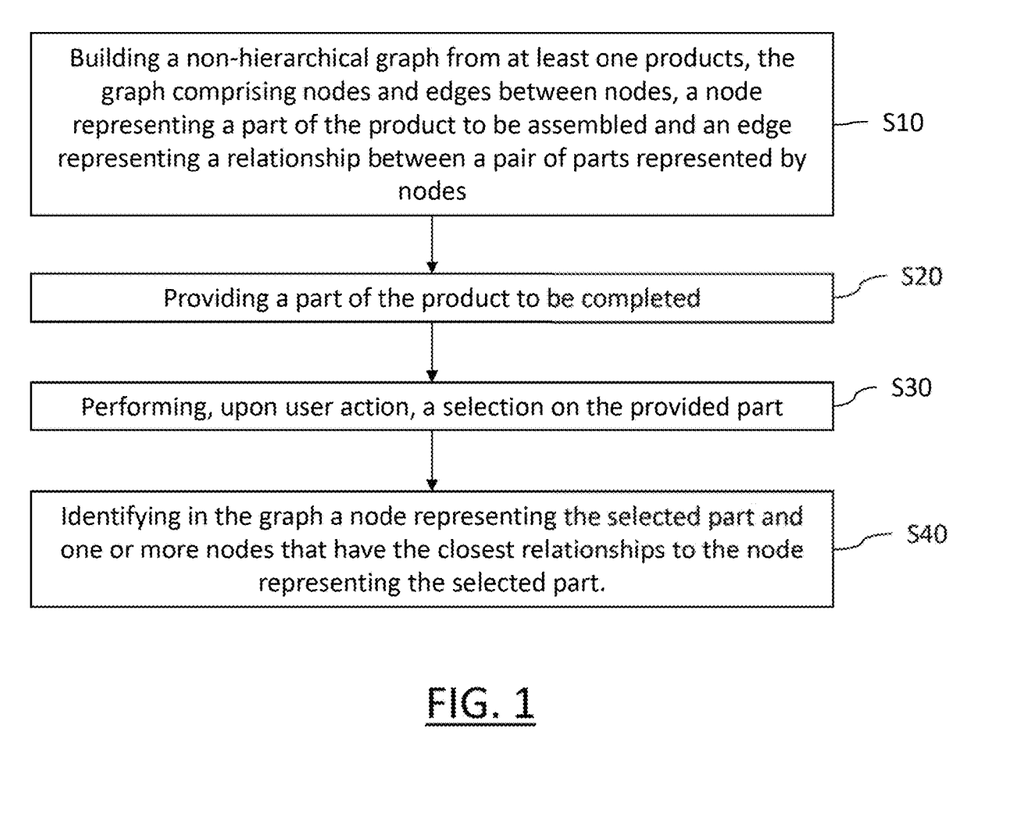
FIG. 1 shows a flowchart of an example of the method.

With reference to the flowchart of FIG. 1, it is proposed a computer-implemented method for assembling parts of a product. The method comprises building a non-hierarchical graph from at least one products. Parts of the at least one products are used for completing a new product. The graph comprises nodes and edges between nodes. A node represents a part of the product to be completed and an edge represents a relationship between a pair of parts represented by nodes. The graph is typically build during a build time. Then, a part of the product to be completed is provided, e.g. the part is displayed in a Graphical User Interface such as the one represented on FIG. 2. Next, a selection is performed on the provided part upon user action, e.g. the user clicks on the provided part with a haptic device such as a mouse. Then, an identification is done in the graph of a node representing the selected part and an identification of one or more nodes that have the closest relationships to the identified node representing the selected part. Such a method improves the assembly (or completing) of a product from existing parts.

Notably, the assembly can be built using single clicks and by reducing duplications. Indeed, the graph provides the system with a complete analysis of the relationships between the parts that are likely to be assembled during design operations of the user; notably, this made possible because the graph is non-hierarchical and is independent of the product structure of the product from which the graph is obtained. One could say that the graph can be read. Thus, it is possible for each selection on a displayed part to traverse horizontally and/or vertically the non-hierarchical graph in order to find the parts that best fit to the user selection. The present invention virtually allows the selection of many parts, and many solutions can be found by serendipity. The design intend of the designer is inferred from the navigation of the graph, and notably the selection performed by the user on the provided part. The designer is free of the tool bars, panels . . . of a "classic" Graphical User Interface (GUI) as illustrated in FIG. 2; being understood that the invention may be performed on such "classic" GUI. Hence, the gap between the designer and the machine is lowered as a part of the knowledge of the designer is now reflected by the system: the interactions between the system and the designer are thus improved. This improvement decreases the waste of computing resources as the system better comprehend what the designer contemplates when building the assembly. Further advantages will be apparent and discussed thereinafter.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the step of providing may be triggered by the designer, e.g. the designer enters the name of a part which is loaded and displayed. As another example, the user performs the selection on the provided part.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one By "database", it is meant any collection of data (i.e. information) organized for search and retrieval (e.g. a relational database, e.g. based on a predetermined structured language, e.g. SQL). When stored on a memory, the database allows a rapid search and retrieval by a computer. Databases are indeed structured to facilitate storage, retrieval, modification, and deletion of data in conjunction with various data-processing operations. The database may consist of a file or set of files that can be broken down into records, each of which consists of one or more fields. Fields are the basic units of data storage. Users may retrieve data primarily through queries. Using keywords and sorting commands, users can rapidly search, rearrange, group, and select the field in many records to retrieve or create reports on aggregates of data according to the rules of the database management system being used, The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semi-conductors, medical devices and equipment), a consumer good (including e.g. furniture, home and garden products, leisure goods, fashion products, hard goods retailers' products, soft goods retailers' products), a packaging (including e.g. food and beverage and tobacco, beauty and FIG. 2 shows an example of "classic" GUI that can be used for performing the method according to the invention.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Assembling parts of a product" designates any action or series of actions which is at least part of a process of elaborating a product. Thus, the method may comprise creating the product from parts previously created.

The method may be included in a manufacturing process, which may comprise, after performing the method, producing the physical product. In any case, the product designed by the method may represent a manufacturing product. Because the method improves the design of the product, the method also improves the manufacturing of the product and thus increases productivity of the manufacturing process.

Referring now to step S10 of FIG. 1, the building (or computation) of a non-hierarchical graph from at least one product is performed. This computation may be performed at a build-time, as opposed to runtime. This means that the graph has been computed before the following steps S20 to S40 are performed; the non-hierarchical is typically stored in a database. The steps S20 to S40 belong to the so-called run-time. The run-time may be performed several times concomitantly or successively while the build-time has been performed one time. The step S10 is thus a back-office operation that compute several information regarding at least one product and stores all results in a non-hierarchical graph called "knowledge graph".

The non-hierarchical graph is built from at least one product. Here the term product comprises an object of the real world may typically be a modeled object or a three-dimensional (3D) modeled object. Each of the at least one product comprises a part or an assembly of parts, or possibly an assembly of products. The at least one product from which the graph is built comprises one or more parts that will be used for designing a new product in accordance with the present invention (S20 to S40).

The knowledge graph (that is, the non-hierarchical graph) comprises nodes and edges between nodes. A node represents a part of the product to be completed, and thus a node of the graph represents a part of one of the at least one product. An edge represents a relationship between a pair of parts represented by nodes; an edge connects a pair of nodes of the graph. Here pair means two nodes. It is to be understood that a node may be connected (that is, may be in relation with) one or more nodes; for instance, two edges may connect the same pair of nodes, e.g. two different relationships have been identified between the nodes of the same pair. In addition, the non-hierarchical graph is not oriented; this involves that the traversal (or navigation) of the graph can be performed from a first node to a second node, and inversely from the second one to the first one.

A relationship represents a relation. In the following the terms "relationship" and "relation" are synonymous and mean a property shared, partly or totally, by a pair of nodes.

In examples of the present invention, a relationship maybe, but is not limited to, of the following types. A first type of relationship is the (i) father/child relationship. First type represents a hierarchy between a pair of parts. For instance, the hierarchy between nodes can be derived from the product structure of the products from which the non-hierarchical graph is built. More generally, the database that stores the products comprises father/child relationship between the parts of the products. A second type of relationship is the (ii) neighbor relationship that represents a distance between a pair of parts. All neighbor distances (that is, all distances between pairs of two nodes) are computed again when a new part is added in the DB; hence, it is not an authoring information. The neighbor distances are computed for any new part of the products with which the non-hierarchical graph is built. A third type of relationship is the (iii) similar shape relationship that represents a global or local similarity in form of a pair of parts. The similarity between two shapes is measured as known in the art. A fourth type of relationship is the (iv) similar function relationship that represents local equivalence of connections between two parts. Here, the 3D shape is not taken into account, but where important local information are located like holes, contact point . . . Two parts (represented by nodes) are functionally equivalent or similar if, for example, they have almost the same hole positions, contact positions . . . A fifth relationship is the (v) fit relationship between two parts. The fit relationship defines the presence of a standardized connection between two parts. For instance, a standardized connection between two parts may be, but is not limited to, a hole for a screw/bolt, a contact surface for a melting point . . . These relationships are standardized because there is a limited number of classes of these configurations.

In examples, the building of the non-hierarchical graph may comprise associating a weight to each edge of the graph. The weight of a graph represents a rate of similarity between the two parts. The weight thus measures how close two parts are.

Figure 14:
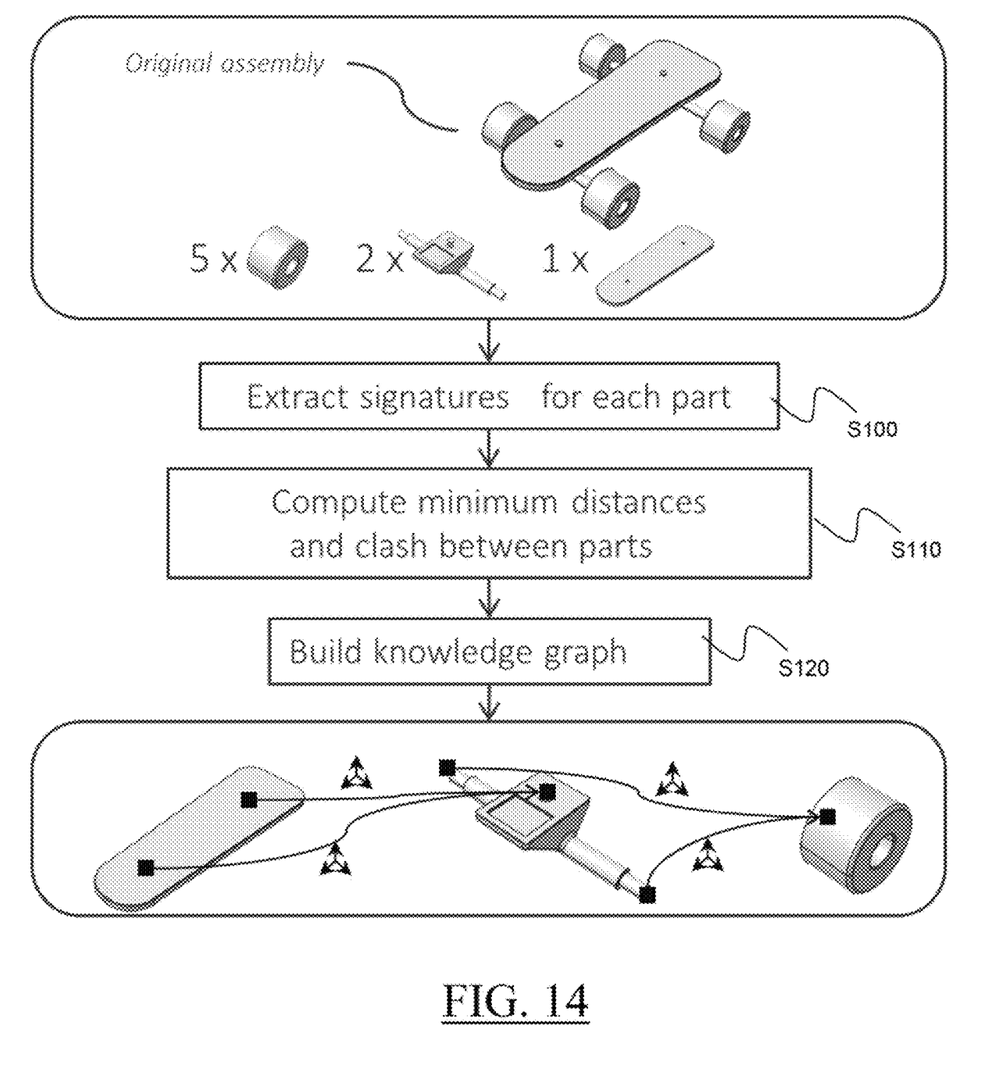
FIGS. 14 to 15 show an example of the invention.

FIG. 14 shows an example of constructing the non-hierarchical graph from a skateboard product that can is an assembly comprising one board, two trucks, and five wheels. In this example, a weight will be associated to an edge as a result of a computation of one or more signatures for each part. The weight represents the distance between the values of the common metric of a pair of nodes, and the weight is typically a value. One or more signatures are computed for each part of each product with which the non-hierarchical graph is built. Each signature can be computed as known in the art; for instance, the signature may be computed from the bounding box of each part, with a 3D Fourrier transformation, using hole layouts . . . Each computed signature has a metric. Hence, between two parts, there are N distances, wherein N is the number of metrics in common with the two parts. Each time there is a common metric between two parts, there is an arc with a "confidence" value (the value of the metric) on the edge of the graph. This confidence value may be expressed in a percentage of closeness of the two parts for a given relationship that is represented by the edge. Thus, after having computed for each part of a pair one or more signatures that have a metric, an edge may be defined between the nodes having a common metric. Then, for each edge, a type of relationship and a weight are associated with the edge. For instance, each relationship in the graph is associated with two attributes: a type of the relationship (e.g. noted as a string) and a weight (e.g. noted float value comprised between 0 and 1, bounds included). For instance, the relationship noted (i) above is a relation that is true or false, and the weight between a child and its father is always 1. For the relationship noted (ii), when two parts are in contact, weight is equal to 1, then the weight value decreases in function of the minimum distance between the parts. Concerning the (iii) similar shape relationship, the weight relies on rate of similarity; when parts are identical, the weight is equal to 1. For the relationship (iv), the weight is a metric between two configurations of function. For the relationship noted (v) above, the signature can be based on the standard and can be retrieved through a simple query.

In the example of FIG. 14, an edge may be defined between the parts of a pair only when the distance is greater that a minimal distance (S110). This means that an edge is built only if there is a "confidence" strong enough that the two nodes have a valid relation.

In addition, still in the example of FIG. 14, a building of the non-hierarchical graph may comprise, in addition to the computing of minimal distances, the computing of clashes between parts of the product. Clash detection (that is, clash computation) allows for the effective identification, inspection and reporting of interferences between parts of the model. This is computed as known in the art. For the computation of clashes, the center of gravity of the intersections surfaces that are projected on the intersected surfaces may be kept. This center of gravity is defined by a point that is called clash point. On FIG. 14, the clash points are represented by the black squares. Interestingly, a part may comprise more than one clash point, as illustrated with the board of the skateboard that comprises two clash points, one for each truck.

Still in the example of FIG. 14, an orientation is identified that is associated with the part of the product to be completed, The orientation of a part is typically stored with the data related to the part, e.g. on a database. This identified orientation is associated with the node representing the part.

Hence, in the building of the non-hierarchical graph exemplified in FIG. 14, each node of the graph represents a part with attributes, where attributes comprise the one or more signatures of the node, an orientation of the part, and one or more clash points.

Figure 9:
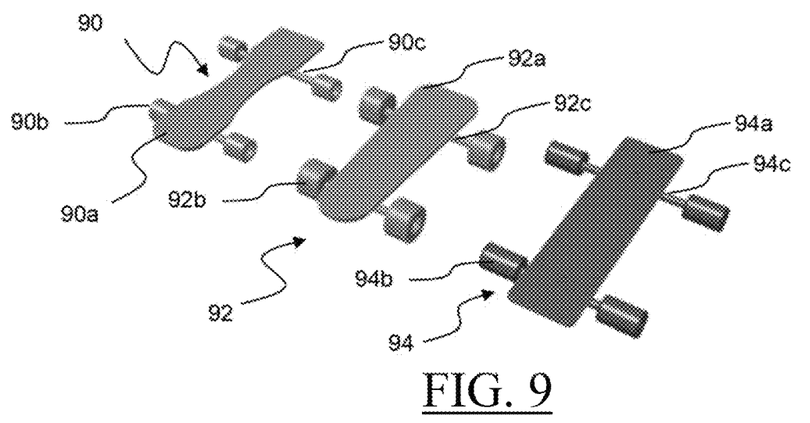
Figure 10:
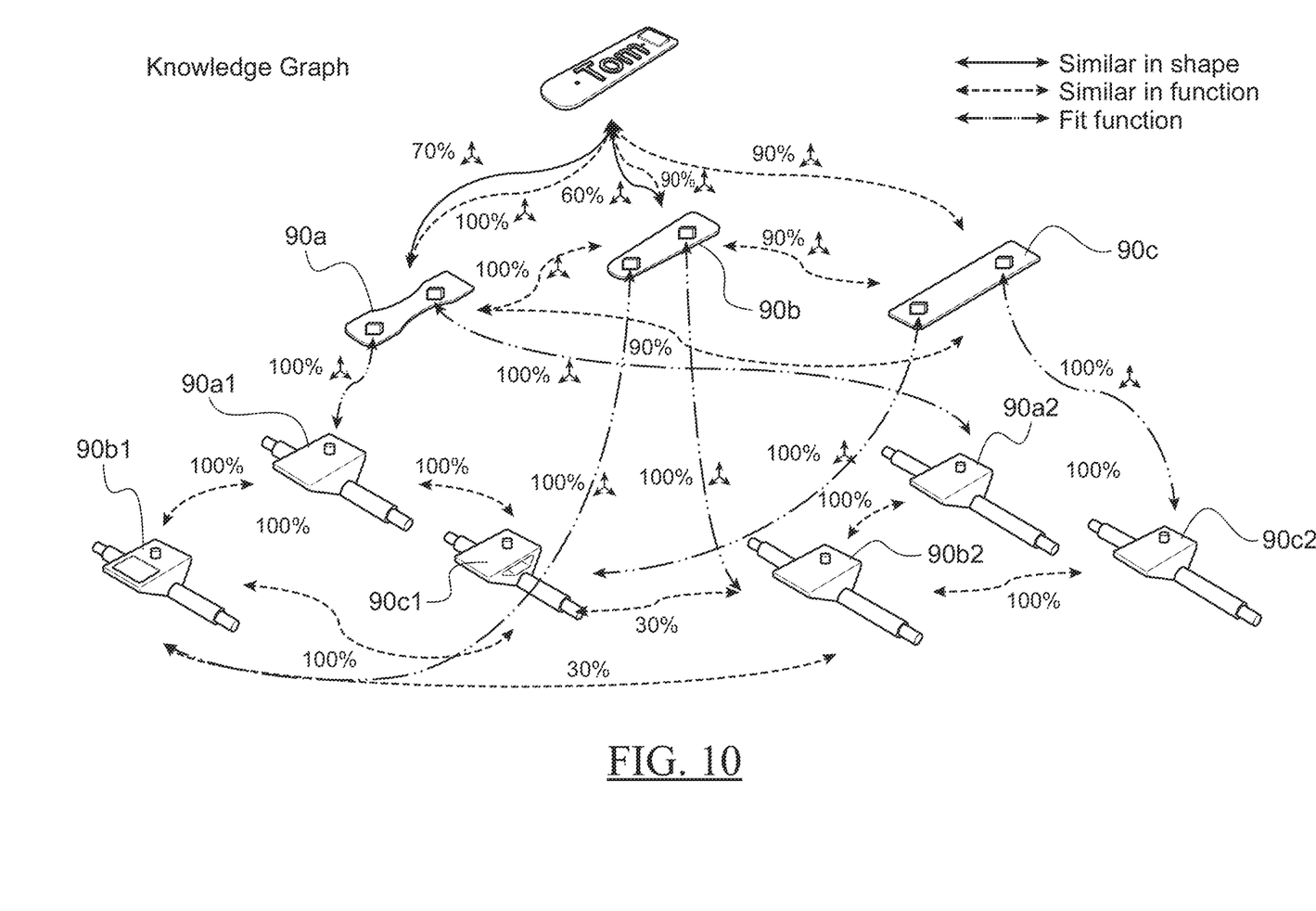

Referring now to FIGS. 9 and 10, an example of building a non-hierarchical graph is discussed. In this example, three skateboards products are stored in a database, e.g. the database is, but not limited to, a relational database, a PLM database, . . . FIGS. 9 shows the representations of these three products 90, 92, 94. Each skateboard comprises the following parts: a board (90*a*, 92*a*, 94*a*), two trucks (90*c*, 92*c*, 94*c*) connected to the board, and wheels (90*b*, 92*b*, 94*b*) connected to the trucks.

FIG. 10 shows a representation of the non-hierarchical graph computed for the three skateboards whose parts will be used to design a new skateboard product. For the sake of clarity only, nodes are represented as parts and the wheel nodes are not displayed. In this example, three relationships have been used: the similarity in shape, the similarity in function, and the fit function. For instance, the node representing the board 90*a* has two edges for the similarity function, one with the node representing the board 90*b* and one with the node representing the board 90*c*. Here, the similarity function that has been computed for same hole positions on the boards. The weight associated with the edge connecting the board 90*a* and 90*b* shows a value of 100%: the holes are located on the exact same position, while the weight associated with the edge connecting the board 90*a* and 90*c* shows a value of 90%: the holes are located on a position that is roughly the same on both boards. For each board, two clash points have been computed as a result of the clash detection between the boards and their respective trucks (90*a*1, 90*a*2, 90*b*1, 90*b*2, 90*c*1, 90*c*2). In this example, a fit function has been computed between parts of a product: the trucks 90*a*1, 90*a*2 fit with the holes of the board 90*a*, the trucks 90*b*1, 90*b*2 fit with the holes of the board 90*b*, the trucks 90*c*1, 90*c*2 fit with the holes of the board 90*c*. In this example, the clash detection and the fit function are related, being understood that the fit functions may be computed between parts that do not belong to the same product—e.g. independently of the clash detection computation on each product. Still in the example of FIG. 10, similarity function relationship between the trucks are represented; for the sale of clarity of the figure only, some edges are not represented. The trucks are similar in function among themselves.

In the example of FIG. 10, the process of creating the non-hierarchical graph is performed as follow. Firstly, each product has been decomposed into parts in accordance with the product structure of each product. Then clashes have been computed for each product. A fit function has been applied for each detected interference in order to determine which function is applied. Functional zones have therefore been determined for each part of each product, where a functional zone of a part comprises a fit relationship with another part of the product. The functional zone may be a point, for instance a clash point; a functional zone may be an area or a volume, e.g. around a clash point. Secondly, similarity function is computed between the parts of the products, including between parts of different products. Notably, the similarity function is applied clash the clash points. Thirdly, a similarity shape is computed between the parts of the products, including between parts of different products.

Interestingly, the identifications of relationships may be more efficient if the parts of each product share a common semantic. For instance, if the parts of each product have the same name, the computation of similarity function may be preferably performed for between boards and trucks, and not for between boards and wheels. As another example, similarity in shape function may be computed only for parts with an identical name, e.g. between boards.

The run-time is now discussed (S20 to S40). At step S20, a part of the product to be completed is provided. Here the terms "completed" and "complemented" are synonyms. In other terms, a product is completed or complemented, or even assembled. For instance, the designer selects a part he/she designed. This step is performed as known in the art. This is illustrated on FIG. 8 where the designer has selected a board. By using a similarity search operation—for instance the designer is on dedicated website that process only skateboard, so there is no ambiguity that the part is a board-, the system is able to identify the model in a database as being a board without asking the designer. Hence, the system knows the semantic of the part that is provided by the designer. In addition, the orientation of the part is also provided (S20). The orientation may be obtained too by relying on similarity search in the database. For instance, thanks to part signatures and with the help of bounding box and available functions on each part on the database, the system knows the orientation the Tom's board compared to the boards in the database.

Then, at step S30, the designer performs a selection on the provided part. A user input on the part is thus performed. The user's selection is typically performed with a haptic device such as a mouse, a touch-sensitive screen, . . . For instance, on FIG. 8, the user has moved a cursor over the provided board and then performed a click on the mouse. This user action on the mouse triggers the identification S40.

At S40, a node is identified in the graph. The identified node represents the selected part. In examples, the node of the provided part is computed and added into the graph built at the built-time. The same operations are performed on the part parts and their respective node are also carried out on the provided part and its node. In examples, the system is aware that the part provided by the user is a board of a skateboard. This allows introducing the node representing the provided part more easily in the built non-hierarchical graph as the computing of relationships can be drastically reduced.

Still at step S40, one or more nodes in the non-hierarchical graph are identified. These identified one or more nodes have the closest relationships to the node representing the selected part. The closeness of the nodes may be obtained with the weight associated with the edges: the closest one or more nodes are those connected to the identified node having the largest weight value(s). In examples, the identified one or more nodes have the best fit with the node representing the selected part. For instance, the one or more nodes have the closest clashes, that is, the clashes that produces the less interferences. The probability the identified nodes fit with the selected part is thus increased.

The selection (S30) that is performed by the designer on the provided part may comprise an identifying a location on the part. The location may be, but is not limited to, a point, a surface, a volume on the part. In this case, the identification (S40) of the one or more nodes is performed according to this location. That is, the navigation in the graph is a function of the location selected by the user. The user can therefore navigate through the graph upon simple user actions, each selection of a location determining the one or more nodes identified in the graph. The choice of a location determines which objects have to be retrieved from the database.

Figure 8:
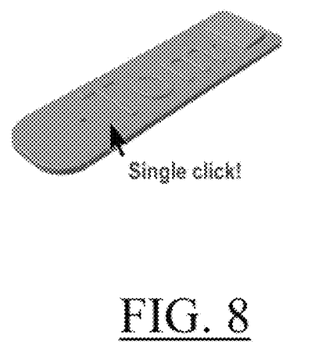
FIGS. 8, 9, 10, 11, 12 and 13 show an example of the invention.
Figure 11:
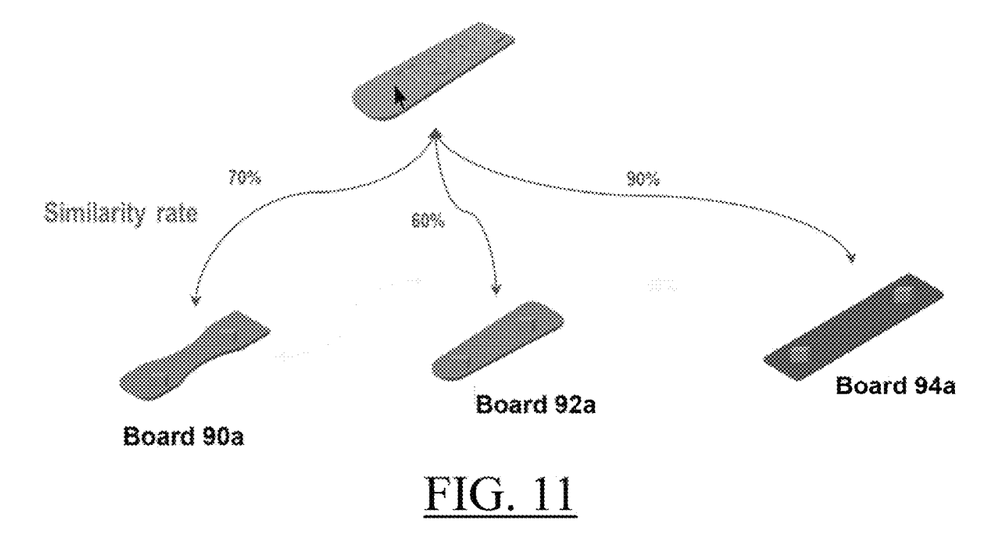
Figure 12:
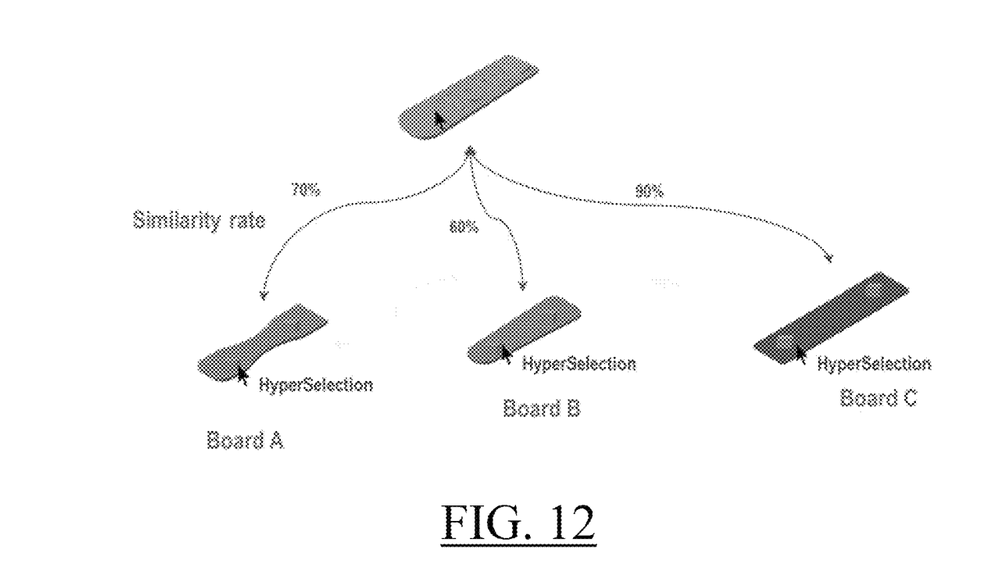
Figure 13:
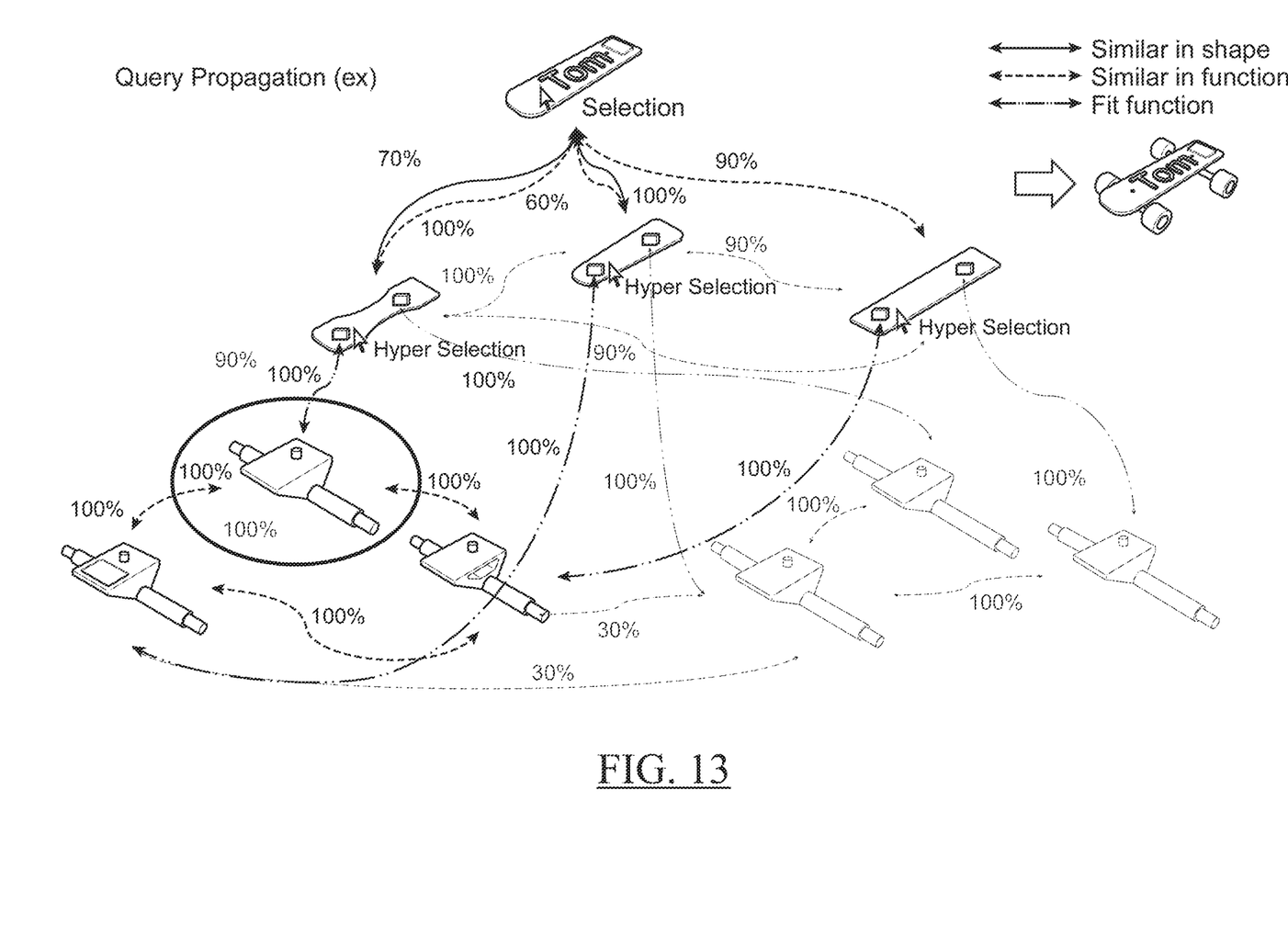

FIGS. 11 to 13 illustrate an example of identification of nodes in the non-hierarchical graph after the determination of a location on the part that is provided (520) as discussed in reference to FIG. 8. In FIG. 8, the designer intends to add a front truck. When the mouse is close enough to the front of the board or the user clicks in the front part of the board. A location in the front part of the board is thus determined. The identification of the location may be performed by computing an intersection between a geometry of the part (the board) and a ray traced. The ray may be traced from the location of the user interaction on the display—e.g. the location of the cursor of a haptic or the location of a user interaction on a touch-sensitive screen—toward the part; the direction of the ray may be determined by the view point of the designer eon the part. Any method determining the location on the part may be used. In FIG. 11, three boards are determined 90a, 90b, 90c are determined from the non-hierarchical graph previously built and represented on FIG. 10. In this example, the boards are determined using the similarity shape function. Interestingly, as the system known the point of location of the selection, it is possible to project this point on the similar shapes (the three boards 90a, 92a, 94a) on the database and identify the closest edges that connect the provided part and the projected points. In FIG. 11, each identified node comprises two clash points. Each clash point is part of the signature of an edge, as explained below in reference to FIG. 10. Thus, virtually, as illustrated on FIG. 12, by performing a selecting on the provided part, the designer selects many others nodes roughly at the same location since they are similar; the closest interference links are thereby selected and the appropriate orientation can be computed as well. At least, the system can retrieve all the front trucks as the designer has selected the front of the provided board, and the system can identify that the orange truck (circled on FIG. 11) is the node with the highest closeness among the front trucks. As a result, the system retrieves from the database the part associated with the selected node; the data of the part or a representation of the part may be retrieved. The retrieved part is represented on the GUI with the provided board. As the both the board and the truck have a respective orientation, the system can compute a position of the truck that best fit with the orientation of the board. The computed orientation can be suggested to the user. The designer can accept or not the retrieved part and/or the suggestion of positioning of the retrieved part.

In examples, the identified location on the provided part may projected on the one or more nodes with the closest relationship, and a functional zone is identified on at least one of the identified nodes. The functional zone may be on/around a clash point. The functional zone may comprise a fit relationship with another part or another functional zone of another part. The fit relationship of a functional zone may define a standardized connection between two parts.

Figure 15:
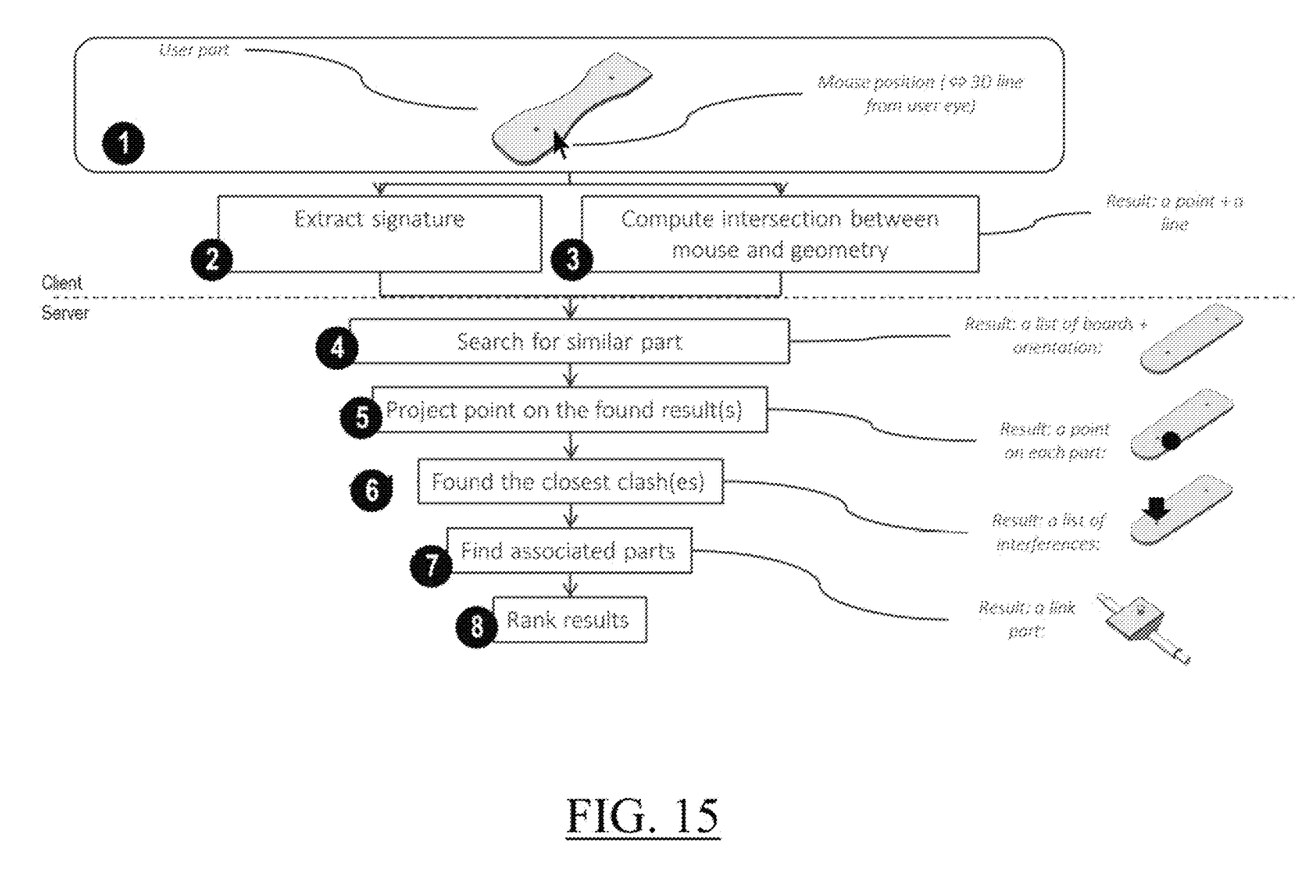

Referring now to FIG. 15, an example of the run-time of the method according to the invention is now discussed. In this example, the designer uses a client computer that is connected to a server; the server may store the non-hierarchical graph and/the parts of the at least one product with which the graph was built. In this example, the server stores both the graph and the parts. The steps 1, 2 and 3 are performed on the client, and the other steps on the server side.

At the first step 1, the designer is designing a product. Since that designer has added no semantic to the part, this part can be seen as unknown from the server. Semantic can be added by the designer, e.g. he/she inputs a normalized name of the part. Semantic can be inferred by the system, e.g. by using a similarity search operation.

At the steps 2 and 3, each location selection on the user part (e.g. a mouse click) generates a line that intersects the geometry if the mouse is over the geometry. The result is a point on geometry. A part identifier may be retrieved from the database. All signatures computed at the builtime are extracted. In order to limit the number of signatures to extract, only signature of parts having the same semantic as the user part may be extracted; signatures of the nodes of the graph that are connected with an edge to the node representing the selected part are obtained.

At step 4, from the extracted signatures a similar search is performed that provides a list of parts. The search provides one or more most similar signatures with the one or more signatures of the node representing the selected part. Of course, the bigger the database is, the more numerous the results will be. In order to decrease the number of results, the system may match orientations of the parts of the list with the selected part at step 1. This operation does not need to be very accurate. Hence, the orientation associated with the provided part and the orientations associated with the identified nodes are used for filtering the result of the search for similar parts: at least one signature of the identified node whose orientation matches with the orientation of the provided part.

At step 5, the selection of point of step 3 is projected on each oriented part identified at step 4. The projection is performed as known in the art.

At step 6, the closest clash point from each projected point is identified. A functional zone is thus identified on each node obtained at step 4. The criteria used for identifying the closest point is a distance, e.g. an Euclidian distance.

Then, at step 7, from each of the functional zones identified at step 6, the nodes that are connected though an edge to the functional zone are identified. Said otherwise, the nodes associated with each functional zone (e.g. a clash point) by a link in knowledge graph are identified. The parts represented by these nodes are retrieved from the database.

At step 8, the retrieved nodes are ranked according to the closeness with the user's part. For instance, the ranking of the retrieved node can be based on the weight of the links.

The client computer can now download the one or more parts associated with the retrieved nodes. All parts can be downloaded, or a number of parts (those on the top of the ranking) can be displayed, or only the part with the highest ranking is downloaded. The downloaded part(s) is(are) then displayed on the GUI. The user can then perform a selection of the new part retrieved from the database, and the process of steps 1 to 8 can be performed again for this new part. Thus, step by step,—that is, user selection after user selection of a location—the designer can navigate the non-hierarchical graph and can assemble parts for creating a new product.

The invention claimed is:

1. A computer-implemented method of identifying parts of a new product by a designer using a client computer that is connected to a server, the server storing a non-hierarchical graph and a database, the method comprising:
   building, by a processor, the non-hierarchical graph from at least two products stored in the database before a design of the new product has started, the database storing an orientation associated with each part of the at least two products, the graph comprising nodes and edges between nodes,
      each node representing a part of one of the at least two products with attributes including an orientation of the part and one or more clash points, and each edge representing a relationship among a set of relationships between a pair of parts represented by nodes, wherein the set of relationships include:
         a father/child relationship that represents a hierarchy between a pair of parts;
         a neighbor relationship that represents a distance between a pair of parts;
         a similar shape relationship that represents a global or local similarity in form of a pair of parts;
         a similar function relationship that represents local equivalence of connections between two parts;
         fit relationship that defines a presence of a standardized connection between two parts;
      the graph comprising at least two edges connecting a same pair of nodes, the two edges representing different relationships,
      a server storing the non-hierarchical graph and the database;
   obtaining a part of the new product to be completed;
   performing, upon user action by a designer using a client computer that is connected to the server, a selection on the obtained part;
   computing and adding, by the processor, in the graph a node representing the selected part;
   identifying one or more nodes that have closest relationships to the node representing the selected part and that have the best fit with the node representing the selected part, the identifying the one or more nodes having the best fit including identifying the one or more nodes having the closest clash points with the least interferences;
   retrieving, from the database, one or more new parts corresponding to one or more identified nodes;
   downloading, by the client computer, the retrieved one or more new parts;
   ranking the one or more identified nodes corresponding to the one or more retrieved new parts according to closeness of relationships to the node representing the selected part;
   computing, for the new part corresponding to the identified node with the highest closeness, a position that fits with the orientation of the obtained part; and
   displaying, to the designer, the part with the new part corresponding to the identified node with the highest closeness at the computed position,
   wherein the identifying of the one or more nodes that have the closest relationships to the node representing the selected part comprises:
      obtaining signatures of the nodes of the graph that are connected with an edge to the node representing the selected part, identifying one or more most similar signatures with the signature of the node representing the selected part,
      identifying the orientation associated with the part of the new product to be completed and associating the identified orientations with each of the one or more nodes that have the closest relationships to the node representing the selected part, and
      filtering the one or more similar signatures by identifying, among the one or more similar signatures, at least one signature whose orientation matches with the orientation of the obtained part of the new product.

2. The computer-implemented method of claim 1, wherein performing the selection on the obtained part further comprises identifying a location on the obtained part of the product, and wherein identifying in the graph the node representing the selected part comprises identifying in the graph the node with the identified location on the obtained part.

3. The computer-implemented method of claim 2, wherein identifying the location on the obtained part comprises computing an intersection between a geometry of the part and ray traced upon user action.

4. The computer-implemented method of claim 3, wherein the identified location on the obtained part comprises a functional zone of the obtained part, a functional zone of the obtained part comprising a fit relationship with another part.

5. The computer-implemented method of claim 2, wherein the identified location on the obtained part comprises a functional zone of the obtained part, a functional zone of the obtained part comprising a fit relationship with another part.

6. The computer-implemented method of claim 5, wherein the fit relationship of a functional zone defines a standardized connection between two parts.

7. The computer-implemented method of claim 1, wherein building the non-hierarchical graph from at least two products comprises:
for each part of each product, computing one or more signatures that have a metric;
for each pair of parts of the products having a common metric:
defining an edge between the nodes representing the pair of parts; and
associating a type of relationship and a weight that is a value representing the distance between the values of the common metric.

8. The computer-implemented method of claim 7, wherein an edge is defined between the parts of a pair when the distance is greater than a minimal distance.

9. The computer-implemented method of claim 1, wherein the identified location on the obtained part comprises a functional zone of the obtained part, a functional zone of the obtained part comprising a fit relationship with another part.

10. The computer-implemented method of claim 1, wherein the method of assembling parts of the product includes assembling the parts of the product in computer aided design.

11. A non-transitory computer readable medium having stored thereon a computer program comprising instructions for implementing a method of identifying parts of a new product by a processor, the method comprising:
building a non-hierarchical graph from at least two products stored in a database before a design of the new product has started, the database storing an orientation associated with each part of the at least two products, the graph comprising nodes and edges between nodes, each node representing a part of one of the at least two products with attributes including an orientation of the part and one or more clash points, and each edge representing a relationship among a set of relationships between a pair of parts represented by nodes, wherein the set of relationships include:
a father/child relationship that represents a hierarchy between a pair of parts;
a neighbor relationship that represents a distance between a pair of parts;
a similar shape relationship that represents a global or local similarity in form of a pair of parts:
a similar function relationship that represents local equivalence of connections between two parts;
fit relationship that defines a presence of a standardized connection between two parts
the graph comprising at least two edges connecting a same pair of nodes. the two edges representing different relationships,
a server storing the non-hierarchical graph and the database;
obtaining a part of the new product to be completed;
performing, upon user action by a designer using a client computer that is connected to the server, a selection on the obtained part;
computing and adding in the graph a node representing the selected part;
identifying one or more nodes that have closest relationships to the node representing the selected part and that have the best fit with the node representing the selected part, the identifying the one or more nodes having the best fit including identifying the one or more nodes having the closest clash points with the least interferences;
retrieving, from the database, one or more new parts corresponding to one or more identified nodes;
downloading, by the client computer, the retrieved one or more new parts;
ranking the one or more identified nodes corresponding to the one or more retrieved new parts according to closeness of relationships to the node representing the selected part;
computing, for the new part corresponding to the identified node with the highest closeness, a position that fits with the orientation of the obtained part; and
displaying, to the designer, the part with the new part corresponding to the identified node with the highest closeness at the computed position,
wherein identifying the one or more nodes that have the closest relationships to the node representing the selected part comprises:
obtaining signatures of the nodes of the graph that are connected with an edge to the node representing the selected part,
identifying one or more most similar signatures with the signature of the node representing the selected part,
identifying the orientation associated with the part of the new product to be completed and associating the identified orientations with each of the one or more nodes that have the closest relationships to the node representing the selected part, and
identifying, among the one or more similar signatures, at least one signature whose orientation matches with the orientation of the obtained part of the new product.

12. A system comprising:
a processor coupled to a memory and a graphical user interface, the memory having recorded thereon a computer program for identifying parts of a new product, the program when executed by the processor causing the processor to be configured to:
build a non-hierarchical graph from at least two products stored in a database before a design of the new product has started, the database storing an orientation associated with each part of the at least two products, the graph comprising nodes and edges between nodes, each node representing a part of one of the at least two products with attributes including an orientation of the part and one or more clash points, and each edge representing a relationship among a set of relationships between a pair of parts represented by nodes, wherein the set of relationships include:
- a father/child relationship that represents a hierarchy between a pair of parts;
- a neighbor relationship that represents a distance between a pair of parts;
- a similar shape relationship that represents a global or local similarity in form of a pair of parts;
- a similar function relationship that represents local equivalence of connections between two parts;
- fit relationship that defines a presence of a standardized connection between two parts the graph comprising at least two edges connecting a same pair of nodes, the two edges representing different relationships,
a server storing the non-hierarchical graph and the database;

obtain a part of the new product to be completed;
perform, upon user action by a designer using a client computer that is connected to the server, a selection on the obtained part;
computing and adding in the graph a node representing the selected part;
identifying one or more nodes that have closest relationships to the node representing the selected part and that have the best fit with the node representing the selected part, the identifying the one or more nodes having the best fit including identifying the one or more nodes having the closest clash points with the least interferences;
retrieving, from the database, one or more new parts corresponding to one or more identified nodes;
downloading, by the client computer, the retrieved one or more new part;
ranking the one or more identified nodes corresponding to the one or more retrieved new parts according to closeness of relationships to the node representing the selected part;
computing, for the new part corresponding to the identified node with the highest closeness, a position that fits with the orientation of the obtained part; and
displaying, to the designer, the part with the new part corresponding to the identified node with the highest closeness at the computed position,
wherein identifying the one or more nodes that have the closest relationships to the node representing the selected part comprises:
obtaining signatures of the nodes of the graph that are connected with an edge to the node representing the selected part,
identifying one or more most similar signatures with the signature of the node representing the selected part,
identifying the orientation associated with the part of the new product to be completed and associating the identified orientations with each of the one or more nodes that have the closest relationships to the node representing the selected part, and
identifying, among the one or more similar signatures, at least one signature whose orientation matches with the orientation of the obtained part of the new product.

* * * * *